US011215508B2

(12) United States Patent
Zeltner et al.

(10) Patent No.: US 11,215,508 B2
(45) Date of Patent: Jan. 4, 2022

(54) TEMPERATURE MEASURING SYSTEM

(71) Applicants: Solar Turbines Incorporated, San Diego, CA (US); Brigham Young University, Provo, UT (US)

(72) Inventors: Darrel Zeltner, Poway, CA (US); Dale R. Tree, Orem, UT (US); Mohsen Rezasoltani, San Diego, CA (US); Scott Egbert, Sandy, UT (US)

(73) Assignees: Solar Turbines Incorporated, San Diego, CA (US); Brigham Young University, Provo, UT (US)

( * ) Notice: Subject to any disclaimer, the term of this patent is extended or adjusted under 35 U.S.C. 154(b) by 491 days.

(21) Appl. No.: 16/265,726

(22) Filed: Feb. 1, 2019

(65) Prior Publication Data

US 2020/0249093 A1 Aug. 6, 2020

(51) Int. Cl.
*G01J 5/00* (2006.01)
*G01J 5/08* (2006.01)

(52) U.S. Cl.
CPC ............ *G01J 5/0088* (2013.01); *G01J 5/0014* (2013.01); *G01J 5/0821* (2013.01)

(58) Field of Classification Search
CPC ........ G01J 5/0014; G01J 5/0088; G01J 5/041; G01J 5/0821; G01J 5/602
See application file for complete search history.

(56) References Cited

U.S. PATENT DOCUMENTS

| 3,623,368 | A | * | 11/1971 | Decker, Jr. ............ | F01D 17/085 374/125 |
|---|---|---|---|---|---|
| 4,142,417 | A | | 3/1979 | Cashdollar et al. | |
| 5,332,901 | A | | 7/1994 | Eckles et al. | |
| 5,755,510 | A | | 5/1998 | Hernandez | |
| 7,217,121 | B2 | | 5/2007 | Thomson et al. | |
| 8,155,890 | B2 | | 4/2012 | Goto et al. | |
| 8,416,415 | B2 | | 4/2013 | Woodmansee et al. | |
| 8,500,442 | B2 | | 8/2013 | Knittel et al. | |
| 2008/0095212 | A1 | * | 4/2008 | Jonnalagadda ....... | G01J 5/0003 374/124 |

(Continued)

FOREIGN PATENT DOCUMENTS

| EP | 2333503 | | 6/2011 |
|---|---|---|---|
| GB | 1506487 | A | 4/1978 |
| GB | 2109472 | A | 6/1983 |

OTHER PUBLICATIONS

M. Willsch et al: "Design of fiber optical high temperature sensors for gas turbine monitoring", SPIE—International Society for Optical Engineering, Proceedings, vol. 7503, Oct. 5, 2009 (Oct. 5, 2009), p. 75037R, XP055689418, US ISSN: 0277-786X, DOI: 10.1117/12.835875 ISBN: 978-1-5106-3377-3 the whole document.

(Continued)

*Primary Examiner* — Yara B Green
(74) *Attorney, Agent, or Firm* — Procopio, Cory, Hargreaves & Savitch LLP; Jeff A. Greene

(57) ABSTRACT

A temperature measuring system is disclosed herein. The temperature measuring system includes an optical assembly and a spectral data receiver. The temperature measuring system views passing gas and measures the radiant response of a selected gas. The measurement includes radiant intensities with respect to wavelengths in the infrared region.

20 Claims, 3 Drawing Sheets

(56) References Cited

U.S. PATENT DOCUMENTS

| | | |
|---|---|---|
| 2011/0240858 A1* | 10/2011 | Estevadeordal ...... G01J 5/0862 |
| | | 250/338.3 |
| 2012/0153157 A1 | 6/2012 | Estevadeordal |
| 2013/0118183 A1* | 5/2013 | Wang ................... G01J 5/0088 |
| | | 60/783 |
| 2017/0211408 A1* | 7/2017 | Ahmadian ............. G01K 17/20 |
| 2018/0073928 A1 | 3/2018 | Nakaya et al. |
| 2018/0248059 A1 | 8/2018 | Kim |
| 2018/0259448 A1 | 9/2018 | Sharma et al. |

OTHER PUBLICATIONS

Yucel Saygin et al: "Effect of Radiation on Gas Turbine Combustor Liner Temperature with Conjugate Heat Transfer (CHT) Methodology", 52nd AIAA/SAE/ASEE Joint Propulsion Conference, Jul. 22, 2016 (Jul. 22, 2016), XP055689288, Reston, Virginia DO1: 10.2514/6.2016-4784 ISBN: 978-1-62410-406-0 abstract.

Ellis, Daniel Jared, "Temperature Measurement Using Infrared Spectral Band Emissions From H2O" (2015). All Theses and Dissertations 5488 Jul. 2015, 62 pages.

* cited by examiner

US 11,215,508 B2

TEMPERATURE MEASURING SYSTEM

TECHNICAL FIELD

The present disclosure generally pertains to a system. More particularly this application is directed toward a temperature measuring system.

BACKGROUND

Temperature, gas species concentration, and heat flux are measurements that can be used to assess, characterize and understand physical processes occurring in flames. Current approaches for making such measurements utilize techniques that are intrusive, impractical to use in systems with complicated hardware, have poor durability, or are of questionable accuracy. High temperatures and corrosive environments make it very difficult to acquire in situ temperature measurements with good temporal and spatial resolution. In addition to these considerations, it is complicated to apply known methods of temperature measurement in situations where temperatures are above 1600° C., e.g., the upper temperature limit of current thermocouples, or when the desired measurement is within an enclosed space, making typical two-color pyrometry methods unusable.

U.S. patent application Ser. No. 15/553,399 to Nakaya, et al. describes a temperature measuring method and device capable of measuring temperature of a gas, and particularly temperature of a gas that contains water vapor, in a non-contact manner and with good precision. A spectroscopic unit acquires at least a light intensity in a first wavelength band and a light intensity in a second wavelength band, from radiated light from water vapor that is an object to be measured. The first wavelength band and the second wavelength band are both near infrared region bands. A central wavelength of the first wavelength band and a central wavelength of the second wavelength band are set to be mutually different values. A temperature calculation unit calculates temperature of water vapor using a ratio of light intensity in the first wavelength band to light intensity in the second wavelength band.

The present disclosure is directed toward overcoming one or more of the problems discovered by the inventors or that is known in the art.

SUMMARY

A temperature measuring system for a gas turbine engine is disclosed herein. In embodiments the temperature measuring device includes an optical assembly and a spectral data receiver. The optical assembly includes a tip end disposed within the turbine. The optical assembly includes a fiber extending through a turbine outer wall, operable to receive the infrared light emitted from a gas and transmit the infrared light along its length. The spectral data receiver is disposed adjacent to the fiber opposite the turbine inner wall, operable to convert the received infrared light into a digital signal. The digital signal including and at least a first light intensity relative to a first wavelength band and a second light intensity relative to a second wavelength band.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
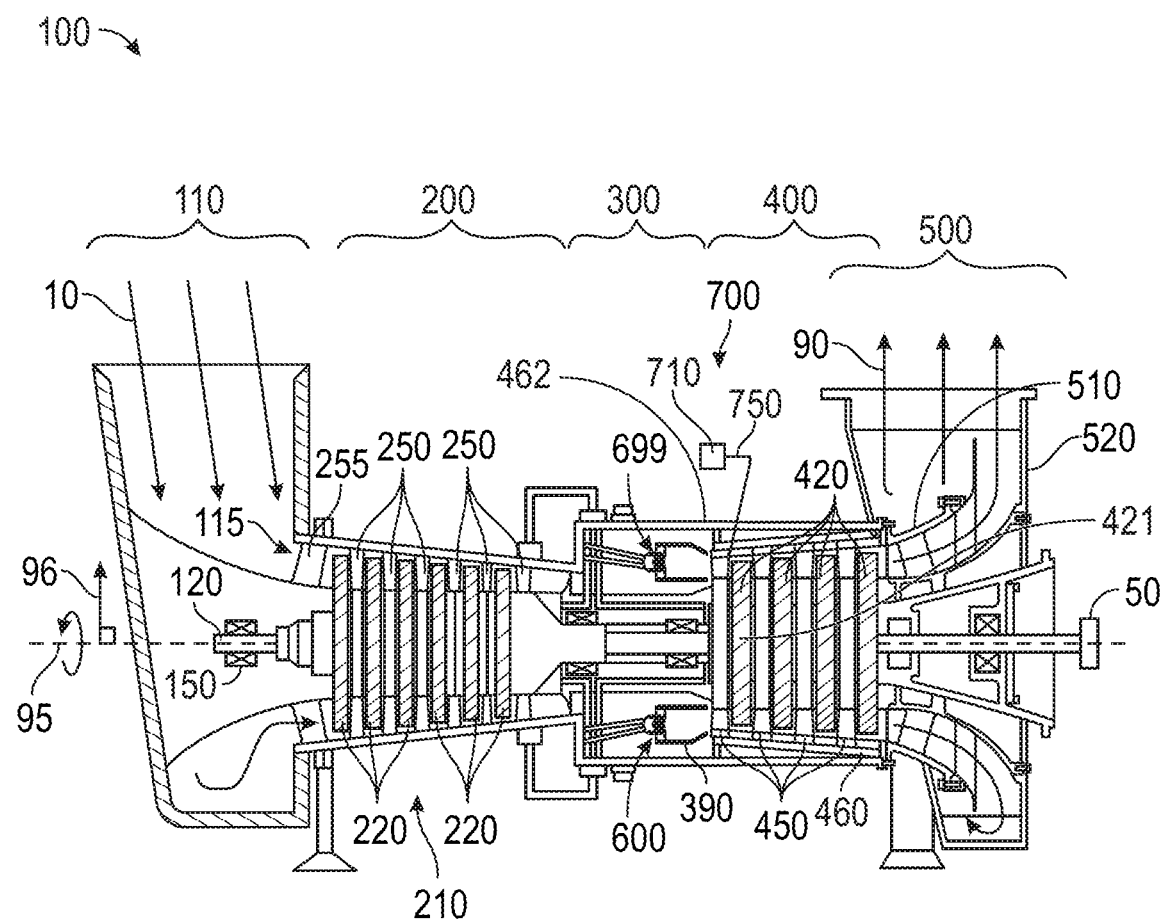
FIG. 1 is a schematic illustration of an exemplary gas turbine engine.

FIG. 1 is a schematic illustration of an exemplary gas turbine engine. Some of the surfaces and reference characters may have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine 100, which may be generally defined by the longitudinal axis of its shaft 120 (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

Structurally, a gas turbine engine 100 includes an inlet 110, a compressor 200, a combustor 300, a turbine 400, an exhaust 500, and a power output coupling 50. The compressor 200 includes one or more compressor rotor assemblies 220. The combustor 300 includes one or more fuel injectors 600 and includes one or more combustion chambers 390. The turbine 400 includes one or more turbine rotor assemblies 420. The exhaust 500 includes an exhaust diffuser 510 and an exhaust collector 520.

As illustrated, both compressor rotor assembly 220 and turbine rotor assembly 420 are axial flow rotor assemblies, where each rotor assembly includes a rotor disk that is circumferentially populated with a plurality of airfoils ("rotor blades"). When installed, the rotor blades associated with one rotor disk are axially separated from the rotor blades associated with an adjacent disk by stationary vanes ("stator vanes" or "stators") 250, 450 circumferentially distributed in an annular casing.

Functionally, a gas (typically air 10) enters the inlet 110 as a "working fluid", and is compressed by the compressor 200. In the compressor 200, the working fluid is compressed in an annular flow path 115 by the series of compressor rotor assemblies 220. In particular, the air 10 is compressed in numbered "stages", the stages being associated with each compressor rotor assembly 220. For example, "4th stage air" may be associated with the 4th compressor rotor assembly 220 in the downstream or "aft" direction—going from the inlet 110 towards the exhaust 500). Likewise, each turbine rotor assembly 420 may be associated with a numbered stage. For example, a first stage turbine rotor assembly 421 is the forward most of the turbine rotor assemblies 420. However, other numbering/naming conventions may also be used.

Once compressed air 10 leaves the compressor 200, it enters the combustor 300, where it is diffused and fuel is added. Air 10 and fuel are injected into the combustion chamber 390 via fuel injector 600 and ignited. After the combustion reaction, energy is then extracted from the combusted fuel/air mixture via the turbine 400 by each stage of the series of turbine rotor assemblies 420. Exhaust gas 90 may then be diffused in exhaust diffuser 510 and collected, redirected, and exit the system via an exhaust collector 520. Exhaust gas 90 may also be further processed (e.g., to reduce harmful emissions, and/or to recover heat from the exhaust gas 90).

The turbine 400 can include a temperature measuring system 700. In an embodiment the temperature measuring system 700 includes a spectral data receiver 710 and an optical assembly 750. The spectral data receiver 710 can be disposed outside of the gas turbine engine 100. The optical assembly 750 extends from the spectral data receiver 710 and can extend into the turbine 400 through a turbine outer wall 462 and a turbine inner wall 460, and be positioned between any of the stages of the series of turbine rotor assemblies 420.

Figure 2:
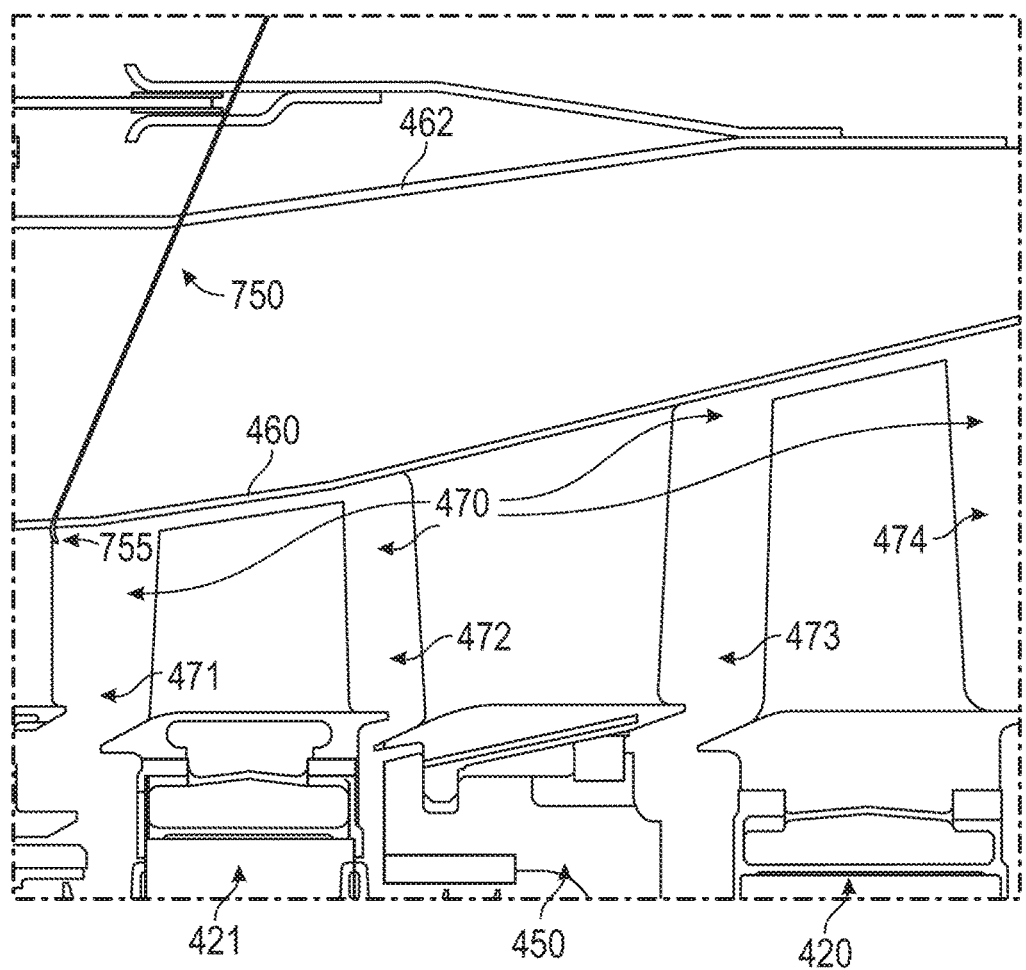
FIG. 2 is a sectional view of a portion of the turbine from FIG. 1 including a portion of an optical assembly.

FIG. 2 is a sectional view of a portion of the turbine 400 of FIG. 1 including a portion of the optical assembly 750. The optical assembly 750 can partially extend through the turbine 400 through the turbine outer wall 462 and the turbine inner wall 460. Alternatively, the optical assembly 750 can partially extend through the combustor 300 and through the injector 600 proximate to location 699 shown in FIG. 1. In an example the optical assembly 750 can partially extend through the combustor 300 and through the combustion chamber 390, proximate to the aft end of the injector 600. The turbine outer wall 462 separates the turbine 400 and the combustor 300 from the surrounding environment. The turbine inner wall 460 contains gas, which includes combustion products, as the gas moves through the turbine rotor assemblies 420 and stators 450 during operation of the turbine engine 100. The optical assembly 750 can be sealed with the turbine inner wall 460 to maintain the pressure and temperature differential between the inner side of the turbine inner wall 460 and outer side of the turbine inner wall 460. The optical assembly 750 can have a tip end 755 that may be at least partially disposed within one of the rotor-stator axial gaps 470 such as a first stage stator-rotor axial gap 471, first stage rotor-stator axial gap 472, a second stage stator-rotor axial gap 473, a second stage rotor-stator axial gap 474, or subsequent stage rotor-stator axial gaps. In an embodiment, the tip end 755 is disposed between the first stage turbine rotor assembly 421 and one of the stators 450. The rotor-stator axial gaps 470 between the turbine rotor assemblies 420 and stators 450 can contain the combustion gas that is produced during operation of the turbine engine 100 from combustion of the fuel and air 10 mixture in the combustion camber 390. In an embodiment, the tip end 755 is disposed within the first stage stator-rotor axial gap 471 which is located between the first stage turbine rotor assembly 421 and assembly stator 450. In another embodiment the tip end 755 can be at least partially adjacent to and in flow communication with one of the rotor-stator axial gaps 470. In an embodiment the tip end 755 can be flush along the inner surface of the turbine inner wall 460. In another embodiment the tip end 755 can be straight. In an embodiment the tip end 755 can be bent or curved. In an embodiment the tip end 755 can be at least partially aligned towards the center axis 95. In another embodiment the tip end 755 can be at least partially oriented along a chord length that extends from a first point along the turbine inner wall 460 across one of the rotor-stator axial gaps 470 and to a second point along the turbine inner wall 460. Additionally, the chord length may be visually unobstructed by other turbine rotor 420 and stator 450 components such as turbine blades and hubs. The unobstructed chord length can be longer than the unobstructed radial distance from the turbine inner wall 460 towards the center axis 95.

Figure 3:
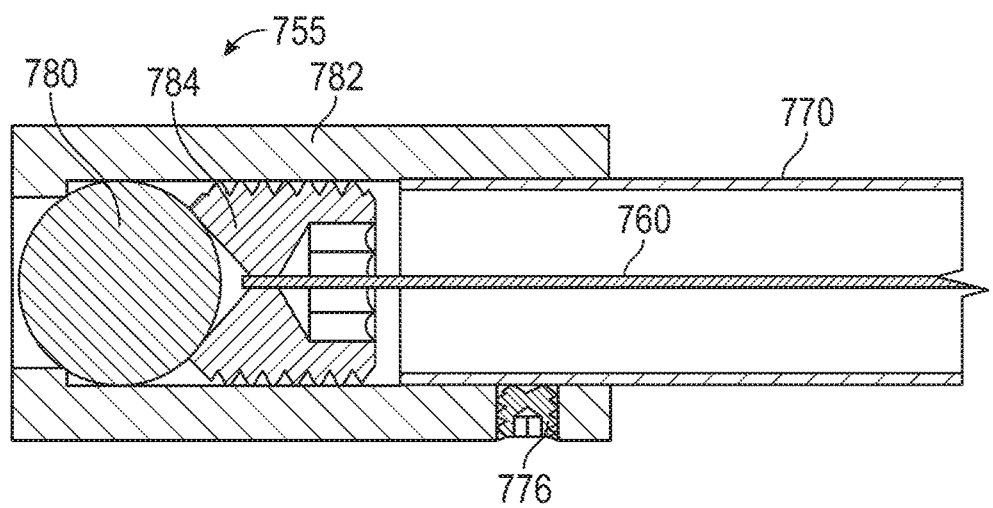
FIG. 3 is a sectional view of an embodiment including a tip end.

FIG. 3 is a cross-section of an exemplary temperature measuring system. In an embodiment the optical assembly 750 extends through the turbine 400. The optical assembly 750 can include a fiber 760, a tube 770, and the tip end 755 disposed opposite from the spectral data receiver 710. In an embodiment the fiber 760 extends from the tip end 755 into the spectral data receiver 710. The fiber 760 may be an optical fiber, operable of transmitting at least a light signal from a first end to the spectral data receiver 710. The fiber 760 may comprise a sapphire fiber and can be operable to transmit light emissions within the 1.7 to 2.63 micrometer range. The fiber 760 may comprise a pure silica fiber or other suitable optical fibers. The tube 770 can be disposed around the fiber 760 and extend axially along a portion of the fiber 760, and be configured to protect the fiber 760 from damage. The tube 770 may comprise stainless steel. The tip end 755 can include a lens 780, a lens holder 782, a lens set screw 784, a tube set screw 776, a portion of the tube 770, and a portion of the fiber 760. The lens holder 782 may comprise stainless steel. In an embodiment, the lens 780 can be disposed within the lens holder 782. The lens 780 may comprise a spherical sapphire lens. The lens 780 may be a plano-convex lens made of Calcium Fluoride. The tube 770 can be partially disposed within the lens holder 782 opposite from the lens 780. The lens set screw 784 can be disposed with in the lens holder 782 between the lens 780 and the tube 770. The fiber 760 can be partially disposed within the lens holder 782. The fiber 760 can be partially disposed within the lens set screw 784 and the tube 770. The lens holder 782 may have a tube set screw 776 that extends through the lens holder 782 and can be adjacent the tube 770.

In an alternative embodiment, the tip end 755 comprises the end of the fiber 760. The fiber 760 may extend through the turbine inner wall 460 and may curve, bend, or be positioned in a variety of orientations while inward of the turbine inner wall 460. The fiber 760 can be disposed adjacent the turbine inner wall 460 and extend away from the turbine inner wall 460 through the turbine outer wall 462. The fiber 760 can be operable to receive the infrared light emitted from the gas or combustion product and transmit the infrared light along its length. The tube 770 can extend from the turbine inner wall 460 towards the spectral data receiver 710. The fiber 760 can be sealed by the tube 770.

Figure 4:
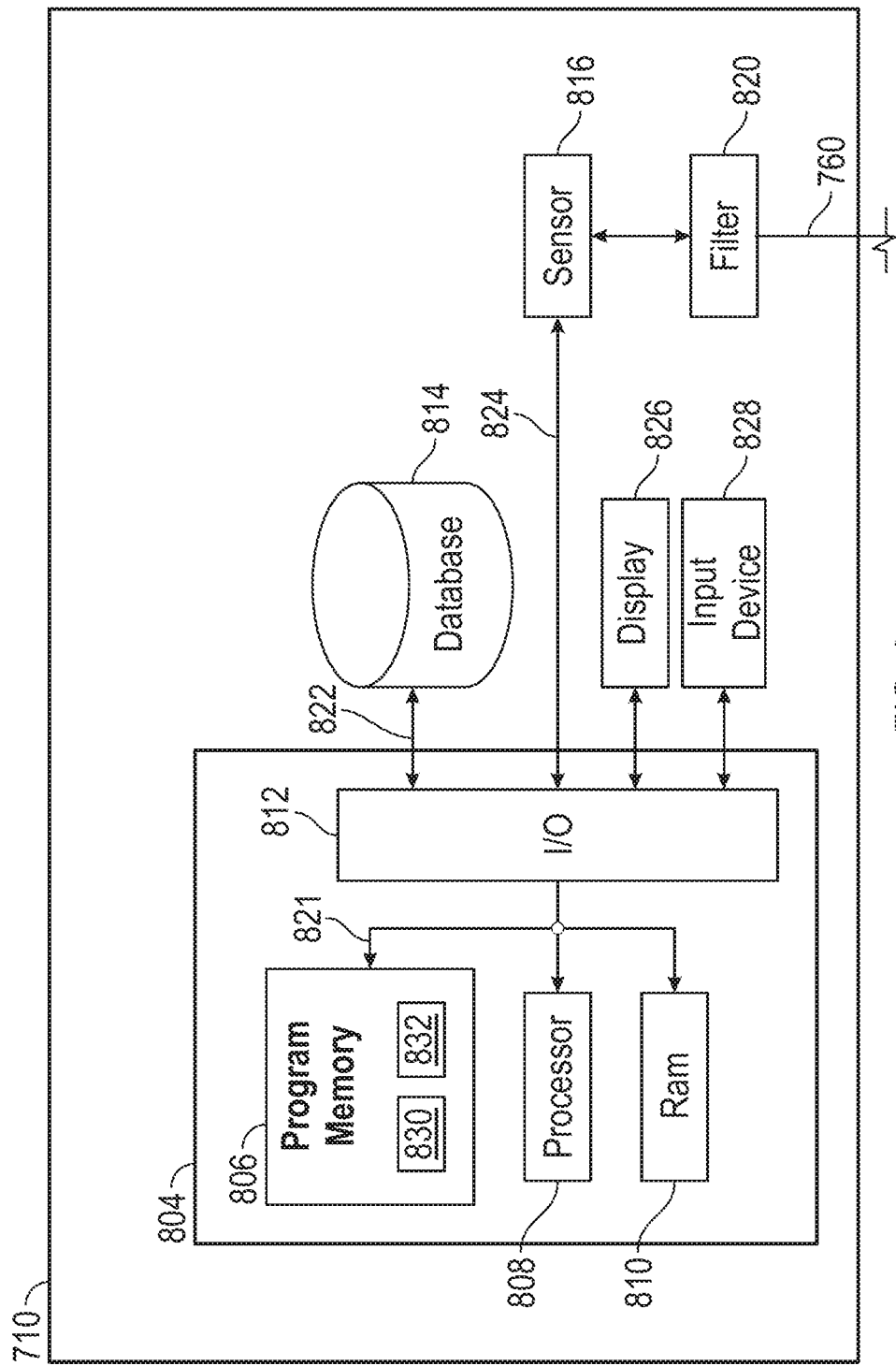
FIG. 4 is a functional block diagram of a spectral data receiver.

FIG. 4 is a functional block diagram of a spectral data receiver. The spectral data receiver 710 may include a portion of the fiber 760, a filter 820 and a sensor 816. The portion of the fiber 760 may extend into the spectral data receiver 710 and be in optical communication with the filter 820. In an embodiment the filter 820 is an optical filter that can allow infrared light within selected wavelength bands to pass through and block out light outside of the selected wavelength bands. In an embodiment the filter 820 is multiple filters. For example, the filters 820 can be selected such that a first light wavelength band is allowed through a first filter, a second wavelength band is allowed through a second filter, a third wavelength band is allowed through a third filter, and a fourth wavelength band is allowed through a fourth filter. A detector or sensor 816 can be used to detect the infrared light that is allowed through the filters 820. In an embodiment the sensor 816 can be multiple sensors or detectors. The sensor 816 that receives the infrared light and can convert the infrared light into a digital signal. The digital signal can be transmitted from the sensor 816, along a link 824 to a controller 804 through an input/output circuit 812. The spectral data receiver 710 may comprise a Fourier transform infrared spectrometer. The spectral data receiver 710 can comprise infrared detectors, optical filters, and sensors such as thermopile detectors, polycrystalline lead sulfide detectors, indium gallium arsenide photodiode detectors infrared light filters, and liquid nitrogen cooled sensors.

The spectral data receiver 710 may have a controller 804 operatively connected to a database 814 via a link 822 connected to an input/output (I/O) circuit 812. It should be noted that, while not shown, additional databases 814 may be linked to the controller 804 in a known manner. Furthermore, these databases 814 may be external to the spectral data receiver 710.

The controller 804 includes a program memory 806, the processor 808 (may be called a microcontroller or a microprocessor), a random-access memory (RAM) 810, and the input/output (I/O) circuit 812, all of which are interconnected via an address/data bus 821. It should be appreciated that although only one microprocessor 808 is shown, the controller 804 may include multiple microprocessors 808. Similarly, the memory of the controller 804 may include multiple RAMs 810 and multiple program memories 806. Although the I/O circuit 812 is shown as a single block, it should be appreciated that the I/O circuit 812 may include a number of different types of I/O circuits. The RAM(s) 810 and the program memories 806 may be implemented as semiconductor memories, magnetically readable memories, nonvolatile memories, and/or optically readable memories, for example.

The program memory 806 and/or the RAM 810 may store various applications (i.e., machine readable instructions) for execution by the microprocessor 808. For example, an operating system 830 may generally control the operation of the spectral data receiver 710 and provide a user interface to the spectral data receiver 710 to implement the processes described herein. The program memory 806 and/or the RAM 810 may also store a variety of subroutines 832 for accessing specific functions of the spectral data receiver 710. By way of example, and without limitation, the subroutines 832 may include, among other things: obtaining, the digital signal associated with an infrared light signal detected by sensor 816, identify the light intensity of the digital signal over a selected wavelength band, generating a visual representation of the light intensity compared to wavelength, integrating the light intensity over a selected wavelength band, comparing the integrated light intensity to a second integrated light intensity to calculate a ratio of integrated intensities, and comparing the integrated intensity ratio to a chart to infer a temperature value that is related to the integrated intensity ratio and wavelength bands selected.

In other examples, the subroutines 832 may further generate a visual representation of the inferred temperature and display the visual representation on display 826 through a graphical user interface. The graphical user interface can visualize or display representations (e.g., plots or diagrams) of multiple (two or more) data sets for a visual/graphical comparison. In some embodiments, more than two sets of data can be compared and contrasted using the spectral data receiver 710. For example, for calibration of the temperature measuring system 700 by comparing known values with recorded values.

The subroutines 832 may include subroutines to execute any of the operations described herein. The subroutines 832 may include other subroutines, for example, implementing software keyboard functionality, interfacing with other hardware in the spectral data receiver 710, etc. The program memory 806 and/or the RAM 810 may further store data related to the configuration and/or operation of the spectral data receiver 710, and/or related to the operation of one or more subroutines 832. For example, the data may be data gathered from the sensor 816, data determined and/or calculated by the processor 808, etc. In addition to the controller 804, the spectral data receiver 710 may include other hardware resources. The spectral data receiver 710 may also include various types of input/output hardware such as the visual display 826 and input device(s) 828 (e.g., keypad, keyboard, etc.). In an embodiment, the display 826 is touch-sensitive, and may cooperate with a software keyboard routine as one of the software routines 832 to accept user input. It may be advantageous for the spectral data receiver 710 to communicate with a broader network (not shown) through any of a number of known networking devices and techniques (e.g., through a computer network such as an intranet, the Internet, etc.). For example, the spectral data receiver 710 may be connected to a database 814 of integrated intensity ratios with respect to certain wavelength bands in comparison to temperature. The database 814 may include spectral information that includes strength of absorption values or emissions lines for water, carbon dioxide, and carbon monoxide with correlation to inputs such as temperature, pressure, and concentration. For example, the database 814 may comprise the database of L. S. Rothman. I. E. G, R. J. Barber, H. Dothe, R. R. Gamache, A. Goldman, V. I. Perevalov, S. A. Tashkun, J. Tennyson. 2010. "HITEMP, the high temperature molecular spectropic database." *Journal of Quantitative Spectroscopy and Radiative Transfer* 3: 2139-2150 (HITEMP 2010).

Alternatively, the database 814, display 826, input device 828, and controller 304 and the rest of its components, can be separate from the spectral data receiver 710, and be included in another system such as a computer or computing device.

INDUSTRIAL APPLICABILITY

The present disclosure generally applies to the temperature measuring system 700 and gas turbine engines 100 having the temperature measuring system 700. The described embodiments are not limited to use in conjunction with a particular type of gas turbine engine 100, but rather may be applied to stationary or motive gas turbine engines, or any variant thereof. Gas turbine engines, and thus their components, may be suited for any number of industrial applications, such as, but not limited to, various aspects of the oil and natural gas industry (including include transmission, gathering, storage, withdrawal, and lifting of oil and natural gas), power generation industry, cogeneration, aerospace and transportation industry, to name a few examples.

Generally, embodiments of the presently disclosed temperature measuring system 700 are applicable to the use, assembly, manufacture, operation, maintenance, repair, and improvement of gas turbine engines 100, and may be used in order to improve performance and efficiency, decrease maintenance and repair, and/or lower costs. In addition, embodiments of the presently disclosed temperature measuring system 700 may be applicable at any stage of the gas turbine engine's 100 life, from design to prototyping and first manufacture, and onward to end of life. Accordingly, the temperature measuring system 700 may be used in a first product, as a retrofit or enhancement to existing gas turbine engine, as a preventative measure, or even in response to an event.

Referring to FIG. 1, a gas (typically air 10) enters the inlet 110 as a "working fluid", and is compressed by the compressor 200. In the compressor 200, the working fluid is compressed in an annular flow path 115 by the series of compressor rotor assemblies 220. In particular, the air 10 is compressed in numbered "stages", the stages being associated with each compressor rotor assembly 220. For example, "4th stage air" may be associated with the 4th compressor rotor assembly 220 in the downstream or "aft" direction, going from the inlet 110 towards the exhaust 500). Likewise, each turbine rotor assembly 420 may be associated with a numbered stage.

In the gas turbine engine 100, air 10 and fuel are injected into the combustion chamber 390 and combusted. Energy is extracted from the combustion reaction via the turbine 400 by the combustion gas passing through each stage of the series of turbine rotor assemblies 420. There is interest to measure the temperature of the combusted air fuel mixture or combustion gas between each stage of the series of turbine rotor assemblies 420 along with other applications with similar adverse environmental conditions. There is also interest to measure the temperature of gas located in the fuel injector 600 and the combustion chamber 390. In an example, the temperature measuring system 700 can measure a temperature within the injector 600 and can detect if a flashback occurs based on a maximum temperature value. In another example, the temperature measuring system 700 can detect if a flameout occurs based on a minimum temperature value.

The temperature measuring system 700 can be used for measuring temperature of gas prior to combustion and in combustion environments using infrared emissions from combustion products found in combustion gas such as water vapor. By utilizing the infrared emissions from the gas or combustion products, a source light is not needed to be produced and used by the temperature measuring system 700. The temperature measuring system 700 can utilize the measured spectral emission intensities of gas or combustion products integrated over different wavelength bands and use the ratio of the integrated intensities to infer the temperature.

During operation of the temperature measuring system 700, the lens 780 can be operable to focus infrared light emitted from gas or a combustion product into the fiber 760. In an embodiment the gas or combustion product may be water vapor. In another embodiment, the gas or combustion product may be carbon dioxide. The fiber 760 can be operable to receive the infrared light from the lens 780 and transmit the infrared light along its length to deliver the infrared light to the spectral data receiver 710. Alternatively, the fiber 760 can be operable to receive the infrared light emitted from gas or a combustion product without the use of a lens 780.

The spectral data receiver 710 can be operable to receive the infrared light and convert the infrared light into a digital signal, the digital signal can include at least a first light intensity relative to a first wavelength band in the short wavelength infrared range and a second light intensity relative to a second wavelength band in the short wavelength infrared range. In other words, the spectral data receiver 710 can receive multiple light intensities with respect to multiple wavelength bands (e.g. including at least a third light intensity with respect to a third wavelength band and a fourth light intensity with respect to a fourth wavelength band).

The digital signal information can be used with the radiative transfer equation:

$$\frac{dI_n}{ds} = \kappa_n I_{b,n} - \beta_n I_n + \frac{\sigma_{s,n}}{4\pi} \int_{4\pi} I_n(\hat{s}_i) \Phi_n(\hat{s}_i, \hat{s}) d\Omega$$

For gases there typically is negligible scattering and it is typically acceptable to neglect scattering for soot particles because the soot particles are so small that the concentration must be unusually large for scattering. This assumption is also typically good for most combustion flows because the concentration of the larger particles is relatively low compared to the fine particles for which scattering is negligible. With negligible scattering the radiative transfer equation is reduced to:

$$\frac{dI_n}{ds} = \kappa_n I_{b,n} - \kappa_n I_n$$

For combustion gases that are located in post flame regions, such as the rotor-stator gaps 470, the temperature and concentrations are generally uniform and lead to uniform temperature and absorption coefficients. This leads to the equations:

$$I_{b,n} = \frac{C_1}{\pi * \eta^5 * \left( \exp\left(\frac{C_2}{\eta T}\right) - 1 \right)}$$

$$\kappa_n = C_{abs} \frac{P_i N_A}{RT}$$

Where $C_{abs}$, $P_i$, R, $N_A$ and T are the absorption cross section, partial pressure, Avogadro's number, the ideal gas constant and absolute temperature respectively. A reduced radiative transfer equation now becomes:

$$I_n(s) = I_{b,n}(1 - \exp(-\kappa_n s))$$

In an embodiment the spectral data receiver 710 records an infrared signal and the first light intensity and first wavelength band, and the second light intensity and second wavelength band are selected from the recorded infrared signal. Multiple light intensities and wavelength bands can be extracted from the recorded infrared signal through the use of the spectral data receiver such as a Fourier-transform infrared spectrometer.

The spectral data receiver 710 or a computing device may be operable to integrate the first light intensity over the first wave length band to produce a first integrated intensity and be operable to integrate the second light intensity over the second wave length to produce a second integrated intensity using the reduced radiative transfer equation above. The first integrated intensity can be divided by the second integrated intensity to produce an integrated intensity ratio. When multiple light intensities are recorded at different temperatures and wavelengths, the produced integrated intensity ratios can produce monotonic functions where a single temperature is associated with the specific integrated intensity ratio.

Furthermore, the first and second wavelength bands can be directed at recording the light intensities produced by the gas or combustion product. Third and fourth wavelength bands can be recorded and selected to measure the light intensities produced by at least one of the hot surfaces containing the gas or combustion product. When measuring temperatures of hot gases, nearby hot surfaces can produce their own light signal or "noise" in the light intensity measurements of the nearby hot gases. To account for this "noise" the light emitted from the nearby hot surface is measured using the third and fourth light wavelength bands selected and can be subtracted from the total light emitted to obtain the light produced by the gas or combustion product and can lead to obtaining a more accurate gas or combustion product temperature. The spectral data receiver 710 can be operable to remove the light signal noise from the first and second light intensity values recorded by utilizing the light signal information recorded from the third and fourth wavelength bands.

The database 814 can provide the energy for each of the emission lines, but may not provide the shape of each emission line. The shape of each emission line is modeled differently by different researchers. For example, the shape and model for individual emission lines may be selected as produced by J. T. Pearson, B. W. Webb, V. P. Solovjov, J. Ma. 2014. "Effect of total pressure on the absorption line blackbody distribution function and radiative transfer in H2O, CO2, and CO." *Journal of the Quantitative Spectroscopy and Radiative Transfer* 143: 100-110.

After selecting the emission line shape, the individual emission lines can be combined to produce a total spectrum. This spectral emission graph is correlated to a given temperature, pressure, and concentration of H2O and CO2. If the temperature were changed in the model, the emission in the graph would change. The model can be exercised with multiple values to see how the integrated band ratios that we have selected change with temperature. Thus, when the measured integrated band ratio matches the modeled integrated band ratio, the measured temperature is assumed to match the modeled temperature. This can allow the temperature measuring system 700 to be operable to produce the calibrated emission ratio and compare with the modeled emission ration without relying on a measured temperature from another device such as a thermocouple.

The temperature measuring system 700 can be calibrated by positioning the temperature measuring system 700 in front of a black body (BB) emitter. The temperature measuring system 700 then can record a measured signal and use the black body temperature to calculate the intensity at the measured wavelengths using Planck's curve. The relationship between the temperature measuring system 700 output and intensity is then known. The database 814 can use the ratios of intensities to determine the gas and background temperatures based on fundamental modeling principles including the HITEMP 2010 database. This process includes calibrating the combined sensitivity of detectors as well as accounting for transmittance losses in the optical components. Alternatively, the black body emitter can be substituted with other emitters such as a tungsten lamp emitter.

The relationship between the ratio of band emissions and temperature is determined through the modeled integrated emissions. Previous methods require data acquisition at high resolution and the uncertainty is dependent on the absolute value of the calibration. By utilizing the integrated intensity ratios, the need for spectral resolution and precise measurement of the spectrum with the spectral data receiver 710 is reduced. The ratio method also reduces the need for absolute calibration of the spectral data receiver 710 and optical assembly 750 and enables the technique to be used with optical filters, sensors, and detectors, along with less sensitive and less expensive equipment. The filters, sensors, and detectors could allow for direct output of the total integrated intensity of the selected wavelength band and would remove the need to for a program and necessary components to perform the integration step, such as when using a Fourier transform infrared spectrometer. Using filters, sensors, and detectors could increase the temporal resolution of the method and can allow for response times of less than a second without the need for post processing to determine the temperature.

In an embodiment the wavelength bands do not overlap. In an embodiment the wavelength bands are between the wavelengths of 1400 nanometers and 3000 nanometers, sometimes referred to the short-wavelength infrared region or as Infrared-B. In an embodiment the gas or combustion products are located within an enclosure. In an embodiment the wavelength bands are between 2.43 micrometers and 2.63 micrometers.

In an embodiment, the lens 780 can be at least partially in fluid communication with or in contact with the gas or combustion product. In an embodiment, the fiber 760 can be at least partially in fluid communication with or in contact with the gas or combustion product. In another embodiment the tip end 755 can be bent or curved such that the lens 780 is directed towards the center axis 95. In another embodiment the tip end 755 can be bent or curved such that the fiber 760 is directed towards the center axis 95. In an embodiment the tip end 755 can be bent or curved such that the lens 780 is shaped to face along a chord length that extends from a first point along the turbine inner wall 460 across one of the rotor-stator axial gaps 470 and to a second point along the turbine inner wall 460. In an embodiment the tip end 755 can be bent or curved such that the fiber 760 is shaped to face along a chord length that extends from a first point along the turbine inner wall 460 across one of the rotor-stator axial gaps 470 and to a second point along the turbine inner wall 460. In an embodiment the fiber 760 can have a shaped or grounded tip to provide lensing effects. The chord length may be visually unobstructed by other turbine rotor 420 and stator 450 components such as turbine blades and hubs. The unobstructed chord length can be longer than the unobstructed radial distance from the turbine inner wall 460 towards the center axis 95 and can lead to an increase in the path length, sometimes referred to as the line of sight. A longer path length can lead to cleaner and stronger infrared light readings and improve the inferred temperature values. In an embodiment the lens 780 can be shaped or positioned such that the lens 780 faces across the radial length of the rotor-stator axial gap 470, which may be towards the center axis 95 or oriented along a chord length that extends from a first point along the turbine inner wall 460 across one of the rotor-stator axial gaps 470 and to a second point along the turbine inner wall 460. In an embodiment the fiber 760 can be shaped or positioned such that the fiber 760 faces across the radial length of the rotor-stator axial gap 470, which may be towards the center axis 95 or oriented along a chord length that extends from a first point along the turbine inner wall 460 across one of the rotor-stator axial gaps 470 and to a second point along the turbine inner wall 460.

In an embodiment the temperature measuring system 700 can be used above 1 atmosphere of pressure. The ratio of in integrated spectral band emissions remain a monotonic function of temperature as pressure increases and the relationship at higher pressure remains similar to the relationship at atmospheric pressure. To benefit from this relationship, the tip end 755 can be operable to endure pressures up to 30 atmospheres and temperatures up to 1650 Kelvin by utilizing appropriate materials and thus facilitate the ability to use the temperature measuring system 700 in industrial applications such as the disclosed gas turbine engine 100.

The preceding detailed description is merely exemplary in nature and is not intended to limit the invention or the application and uses of the invention. The described embodiments are not limited to use in conjunction with a particular type of gas turbine engine or a particular combustor. Hence, although the present disclosure, for convenience of explanation, depicts and describes particular embodiments of the temperature measuring system, it will be appreciated that the temperature measuring system in accordance with this disclosure can be implemented in various other configurations, can be used with various other types of combustors and gas turbine engines, and can be used in other types of machines. Any explanation in connection with one embodiment applies to similar features of other embodiments, and elements of multiple embodiments can be combined to form other embodiments. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A temperature measuring system for a gas turbine engine having a turbine with a turbine outer wall, a turbine inner wall, and rotor-stator axial gaps, comprising:
    an optical assembly including
        a tip end disposed within the turbine; and
        a fiber extending through the turbine outer wall, operable to receive an infrared light emitted from a gas and transmit the infrared light along its length; and
    a spectral data receiver disposed adjacent to the fiber opposite the tip end, operable to convert the received infrared light into a digital signal, the digital signal including and at least a first light intensity relative to a first wavelength band and a second light intensity relative to a second wavelength band, wherein the temperature of the gas based on the digital signal is calculated using a reduced radiative transfer equation.

2. The temperature measuring system claim 1, wherein the tip end is at least partially disposed within one of the rotor-stator axial gaps.

3. The temperature measuring system claim 2, wherein the tip end is at least partially oriented along a chord length that extends from a first point along the turbine inner wall across one of the rotor-stator axial gaps and to a second point along the turbine inner wall.

4. The temperature measuring system claim 1, wherein the fiber is shaped to face along a chord length that extends from a first point along turbine inner wall across one of the rotor-stator axial gaps and to a second point along the turbine inner wall.

5. The temperature measuring system of claim 1, wherein the gas is water vapor.

6. The temperature measuring system of claim 1, wherein the fiber is in fluid communication with the gas.

7. A method for measuring temperature of a gas produced within a turbine during operation of a gas turbine engine, the method comprising:
    receiving, at a fiber, an infrared light emitted from the gas within the turbine;
    transmitting the infrared light along the fiber;
    receiving, at a spectral data receiver, the infrared light from the fiber;
    converting, at the spectral data receiver, the infrared light into a digital signal, the digital signal including at least a first light intensity relative to a first wavelength band and a second light intensity relative to a second wavelength band; and
    calculating a temperature of the gas based on the digital signal using a reduced radiative transfer equation.

8. The method of claim 7, wherein the calculating comprises integrating the first light intensity over the first wave length band to produce a first integrated intensity and is operable to integrate the second light intensity over the second wave length to produce a second integrated intensity.

9. The method of claim 8, wherein the calculating comprises inferring the temperature based on the integrated intensity ratio between the first integrated intensity the second integrated intensity.

10. The method of claim 9, further comprising
    recording the digital signal to memory, and
    operating the gas turbine engine based on the temperature of the gas.

11. The method of claim 10, wherein the operating comprises adjusting a fuel and air mixture supplied to the gas turbine engine based on the temperature of the gas.

12. The method claim 7, wherein the first wavelength band and the second wavelength band are within the Infrared-B wavelength range.

13. The method of claim 7, wherein the fiber comprises sapphire.

14. A temperature measuring system comprising:
    an optical assembly including
        a fiber operable to receive an infrared light emitted from a gas and transmit the infrared light along its length; and
    a spectral data receiver operable to receive the infrared light from the fiber, and operable to convert the received infrared light into a digital signal, the digital signal including at least a first light intensity relative to a first wavelength band between 2.43 micrometers and 2.63 micrometers and a second light intensity relative to a second wavelength band between 2.43 micrometers and 2.63 micrometers.

15. The temperature measuring system of claim 14, wherein the spectral data receiver is operable to record the digital signal to memory.

16. The temperature measuring system of claim 15, wherein the spectral data receiver is operable to integrate the recorded first light intensity over the first wave length band to produce a first integrated intensity and is operable to integrate the recorded second light intensity over the second wave length to produce a second integrated intensity using a reduced radiative transfer equation.

17. The temperature measuring system of claim 16, wherein the spectral data receiver is operable to infer a temperature based on the integrated intensity ratio between the first integrated intensity the second integrated intensity.

18. The temperature measuring system of claim 15, wherein the spectral data receiver is operable to convert a least a third light intensity relative to a third wavelength band and a fourth light intensity relative to a fourth wavelength band.

19. The temperature measuring system of claim 17, wherein the spectral data receiver is operable to remove the light signal noise from the first and second light intensity values recorded by utilizing the light signal information recorded from the third and fourth wavelength bands.

20. The temperature measuring system of claim 14, wherein the first wavelength band and the second wavelength band do not overlap.

\* \* \* \* \*